(12) United States Patent
Narulkar et al.

(10) Patent No.: US 11,392,769 B2
(45) Date of Patent: Jul. 19, 2022

(54) SYSTEMS AND METHODS FOR EXPERT DRIVEN DOCUMENT IDENTIFICATION

(71) Applicant: FMR LLC, Boston, MA (US)

(72) Inventors: Gunjan Narulkar, Bangalore (IN); Shreyash Kumar Sharma, Bangalore (IN); Greeshma Girish, Bangalore (IN)

(73) Assignee: FMR LLC, Boston, MA (US)

(*) Notice: Subject to any disclaimer, the term of this patent is extended or adjusted under 35 U.S.C. 154(b) by 1 day.

(21) Appl. No.: 16/930,026

(22) Filed: Jul. 15, 2020

(65) Prior Publication Data

US 2022/0019738 A1 Jan. 20, 2022

(51) Int. Cl.
| | |
|---|---|
| *G06F 40/279* | (2020.01) |
| *G06F 40/232* | (2020.01) |
| *G06F 16/33* | (2019.01) |
| *G06F 16/93* | (2019.01) |
| *G06F 40/10* | (2020.01) |

(52) U.S. Cl.
CPC ........ *G06F 40/279* (2020.01); *G06F 16/3344* (2019.01); *G06F 16/93* (2019.01); *G06F 40/10* (2020.01); *G06F 40/232* (2020.01)

(58) Field of Classification Search
CPC .... G06F 40/30; G06F 40/279; G06F 16/3344; G06F 16/93; G06F 40/10; G06F 40/232
See application file for complete search history.

(56) References Cited

U.S. PATENT DOCUMENTS

| 8,788,523 B2 | 7/2014 | Martin et al. |
| 9,158,839 B2 | 10/2015 | Hudek |

(Continued)

FOREIGN PATENT DOCUMENTS

| CN | 107862089 A | * | 3/2018 | ......... G06F 16/3344 |
| CN | 111078834 A | * | 4/2020 | ............. G06F 16/33 |
| CN | 112463958 A | * | 3/2021 | |

OTHER PUBLICATIONS

Christopher D. Manning, Prabhakar Raghavan and Hinrich Schütze, "Introduction to Information Retrieval", Cambridge University Press. 2008, 581 pages, http://informationretrieval.org/ (Year: 2008).*

(Continued)

*Primary Examiner* — Benjamin Smith
(74) *Attorney, Agent, or Firm* — Proskauer Rose LLP

(57) ABSTRACT

Systems and methods for identifying data strings in electronic documents using pattern recognition. The method includes receiving a first data string corresponding to an electronic reference document from a first database and a second data string corresponding to an electronic legal document from a second database. The method also includes processing the first data string into a first processed data string and processing the second data string into a second processed data string. The method also includes calculating a cosine similarity between the first processed data string and the second processed data string. The method also includes receiving a feedback score from a user which corresponds to an accuracy of the calculated cosine similarity. The method also includes calculating an adjusted cosine similarity between the first processed data string and the second processed data string based on the calculated cosine similarity and the feedback score.

18 Claims, 7 Drawing Sheets

(56) References Cited

U.S. PATENT DOCUMENTS

| | | | |
|---|---|---|---|
| 9,645,988 B1 | 5/2017 | Warren et al. | |
| 10,108,697 B1* | 10/2018 | Poteet | G06F 16/38 |
| 10,489,438 B2* | 11/2019 | Bhatt | G06F 16/335 |
| 10,824,661 B1* | 11/2020 | Huang | G06F 16/34 |
| 11,042,810 B2* | 6/2021 | Shah | G06N 20/20 |
| 11,082,800 B2* | 8/2021 | Shaposhnikov | H04W 4/029 |
| 2008/0306784 A1 | 12/2008 | Rajkumar et al. | |
| 2009/0327320 A1* | 12/2009 | Yan | G06F 16/35 |
| 2014/0279299 A1* | 9/2014 | Erenrich | G06Q 40/02 705/30 |
| 2014/0280145 A1* | 9/2014 | Heit | G06F 16/285 707/737 |
| 2015/0032717 A1* | 1/2015 | Cramer | G06F 16/24575 707/709 |
| 2016/0179945 A1* | 6/2016 | Lastra Diaz | G06F 16/284 707/739 |
| 2016/0283471 A1* | 9/2016 | Nelson | G06F 16/958 |
| 2016/0335260 A1* | 11/2016 | Convertino | G06F 16/2358 |
| 2017/0161372 A1* | 6/2017 | Fernández | G06F 40/211 |
| 2017/0337266 A1* | 11/2017 | Bhatt | G06F 16/335 |
| 2018/0137516 A1* | 5/2018 | Zhang | G06Q 10/06311 |
| 2019/0149626 A1* | 5/2019 | Shah | G06N 7/005 706/12 |
| 2020/0134058 A1* | 4/2020 | Liu | G06F 16/367 |
| 2020/0364270 A1* | 11/2020 | Harpale | G06F 16/93 |
| 2020/0409951 A1* | 12/2020 | Kowolenko | G06F 40/284 |
| 2021/0056129 A1* | 2/2021 | Huang | G06F 16/35 |
| 2021/0090174 A1* | 3/2021 | Altfest | G06Q 40/08 |
| 2021/0136514 A1* | 5/2021 | Shaposhnikov | G06N 20/00 |
| 2021/0158182 A1* | 5/2021 | Duvvuri | G06F 16/285 |
| 2021/0241163 A1* | 8/2021 | Witztum | G06N 20/00 |

OTHER PUBLICATIONS

Galke, L., Saleh, A. & Scherp, A., (2017). Word Embeddings for Practical Information Retrieval. In: Eibl, M. & Gaedke, M. (Hrsg.), INFORMATIK 2017. Gesellschaft fur Informatik, Bonn. (S. 2155-2167). DOI: 10.18420/in2017_215 (Year: 2017).*

* cited by examiner

SYSTEMS AND METHODS FOR EXPERT DRIVEN DOCUMENT IDENTIFICATION

FIELD OF THE INVENTION

The present invention relates generally to systems and methods for identifying data strings in electronic documents, including systems and methods for identifying data strings in electronic documents using pattern recognition.

BACKGROUND OF THE INVENTION

Generally, organizations create and store electronic documents that contain client data corresponding to the relationships between the organization and the client. For example, contracts are the legally binding agreements, amendments, and other related documents established with clients which helps organizations and institutions stay compliant with existing regulations while safeguarding mutual interests during any unforeseen event. The process of creating and reviewing a contract is completely manual; typically a legal expert ("expert") will use their overall experience on contract execution to decide on the contents of the contract in such a way as to protect the interests of the involved parties in the best possible manner.

However, many institutions have a significant number of clients, and for each client there can be multiple revisions and amendments within the client's existing electronic documents. For example, if there is a need to identify a specific contract clause from within this vast collection of electronic documents, it may take a substantial amount of time and effort to manually go through all the available electronic documents and manually flag the ones that have the specific clause. Therefore, there is a need for improving the electronic document creation and review process such that less time and effort is required of experts during electronic document creation and review.

SUMMARY OF THE INVENTION

Accordingly, an object of the invention is to provide systems and methods for identifying data strings in electronic documents. It is an object of the invention to provide systems and methods for identifying data strings in electronic documents using pattern recognition. It is an object of the invention to provide systems and methods for searching, identifying, reviewing, and tagging data strings within electronic documents using pattern recognition. It is an object of the invention to provide systems and methods for determining feedback from users in order to automate the improvement of identifying data strings in electronic documents.

In some aspects, a method for identifying data strings in electronic documents using pattern recognition includes receiving, by a server computing device, a first data string corresponding to a first sentence of an electronic reference document from a first database. The method further includes receiving, by the server computing device, a second data string corresponding to a second sentence of an electronic legal document from a second database. The method also includes processing, by the server computing device, the first data string corresponding to the first sentence into a first processed data string. Processing the first data string includes at least one of removing stop words, removing punctuation, removing digits, converting all characters to lower-case, or lemmatization. Further, the method includes processing, by the server computing device, the second data string corresponding to the second sentence into a second processed data string. Processing the second data string includes at least one of removing stop words, removing punctuation, removing digits, converting all characters to lower-case, or lemmatization.

Further, the method also includes calculating, by the server computing device, a cosine similarity between the first processed data string and the second processed data string. The cosine similarity is based on a term frequency-inverse document frequency algorithm and a centroid-based algorithm. The method also includes receiving, by the server computing device, a feedback score from a user. The feedback score corresponds to an accuracy of the calculated cosine similarity between the first processed data string and the second processed data string. The method further includes calculating, by the server computing device, an adjusted cosine similarity between the first processed data string and the second processed data string based on the calculated cosine similarity and the feedback score.

In some embodiments, the server computing device is configured to process the first data string and the second data string by removing stop words. In other embodiments, the server computing device is configured to process the first data string and the second data string by removing punctuation. In some embodiments, the server computing device is configured to process the first data string and the second data string by removing digits. In other embodiments, the server computing device is configured to process the first data string and the second data string by converting all characters to lower-case. In some embodiments, the server computing device is configured to process the first data string and the second data string through lemmatization.

In some embodiments, the term frequency-inverse document frequency algorithm includes comparing words of the first processed data string with words of the second processed data string one word at a time. In other embodiments, the centroid-based algorithm includes representing words of the first processed data string and words of the second processed data string as real-valued vectors.

In some embodiments, the server computing device is configured to calculate the adjusted cosine similarity based on a random forest machine learning algorithm. In other embodiments, the server computing device is configured to generate for display the first sentence of the first plurality of sentences, the second sentence of the second plurality of sentences, and at least one of the calculated cosine similarity, the feedback score, or the calculated adjusted cosine similarity.

In some aspects, a system for identifying data strings in electronic documents using pattern recognition includes a server computing device communicatively coupled to a first database, a second database, and a display device. The server computing device is configured to receive a first data string corresponding to a first sentence of an electronic reference document from the first database. The server computing device is also configured to receive a second data string corresponding to a second sentence of an electronic legal document from the second database. Further, the server computing device is configured to process the first data string corresponding to the first sentence into a first processed data string. Processing the first data string includes at least one of removing stop words, removing punctuation, removing digits, converting all characters to lower-case, or lemmatization. The server computing device is also configured to process the second data string corresponding to the second sentence into a second processed data string. Processing the second data string includes at least one of removing stop words, removing punctuation, removing digits, converting all characters to lower-case, or lemmatization.

Further, the server computing device is configured to calculate a cosine similarity between the first processed data string and the second processed data string. The cosine similarity is based on a term frequency-inverse document frequency algorithm and a centroid-based algorithm. The server computing device is also configured to receive a feedback score from a user. The feedback score corresponds to an accuracy of the calculated cosine similarity between the first processed data string and the second processed data string. Further, the server computing device is configured to calculate an adjusted cosine similarity between the first processed data string and the second processed data string based on the calculated cosine similarity and the feedback score.

In some embodiments, the server computing device is configured to process the first data string and the second data string by removing stop words. In other embodiments, the server computing device is configured to process the first data string and the second data string by removing punctuation. In some embodiments, the server computing device is configured to process the first data string and the second data string by removing digits. In other embodiments, the server computing device is configured to process the first data string and the second data string by converting all characters to lower-case. In some embodiments, the server computing device is configured to process the first data string and the second data string through lemmatization.

In some embodiments, the term frequency-inverse document frequency algorithm includes comparing words of the first processed data string with words of the second processed data string one word at a time. In other embodiments, the centroid-based algorithm includes representing words of the first processed data string and words of the second processed data string as real-valued vectors.

In some embodiments, the server computing device is configured to calculate the adjusted cosine similarity based on a random forest machine learning algorithm. In other embodiments, the server computing device is configured to generate for display the first sentence of the first plurality of sentences, the second sentence of the second plurality of sentences, and at least one of the calculated cosine similarity, the feedback score, or the calculated adjusted cosine similarity.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

In some aspects, the systems and methods described herein can include one or more mechanisms or methods for identifying data strings in electronic documents. Specifically, the system and methods described herein can include mechanisms or methods for identifying data strings in electronic documents using pattern recognition. The systems and methods described herein can include one or more mechanisms or methods for searching, identifying, reviewing, and tagging data strings within electronic documents using pattern recognition. The systems and methods described herein can include one or more mechanisms or methods for determining feedback from users in order to automate the improvement of identifying data strings in electronic documents.

The systems and methods described herein can include one or more mechanisms or methods for leveraging the pre-identified legal clauses provided by the experts and finding the probabilistic match within each electronic document available, in order to avoid manual searching. The systems and methods described herein can include one or more mechanisms or methods for creating a legal language search engine which provides a set of electronic documents matching the input legal clauses. The systems and methods described herein can include one or more mechanisms or methods for an expert feedback collection mechanism to improve the results on an ongoing basis.

Figure 1:
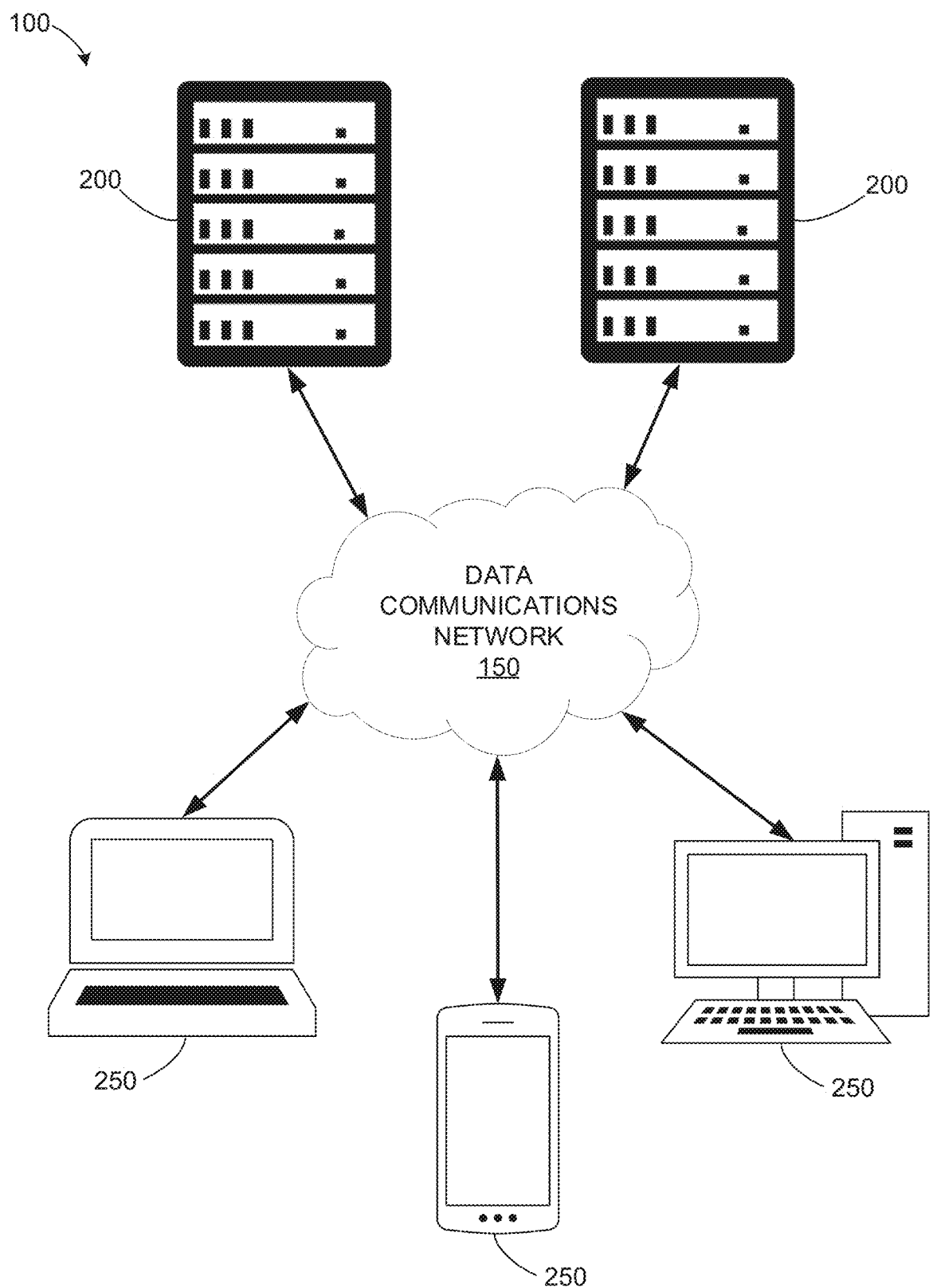
FIG. 1 is a block diagram of an exemplary data communications network, according to embodiments of the technology described herein.
Figure 2:
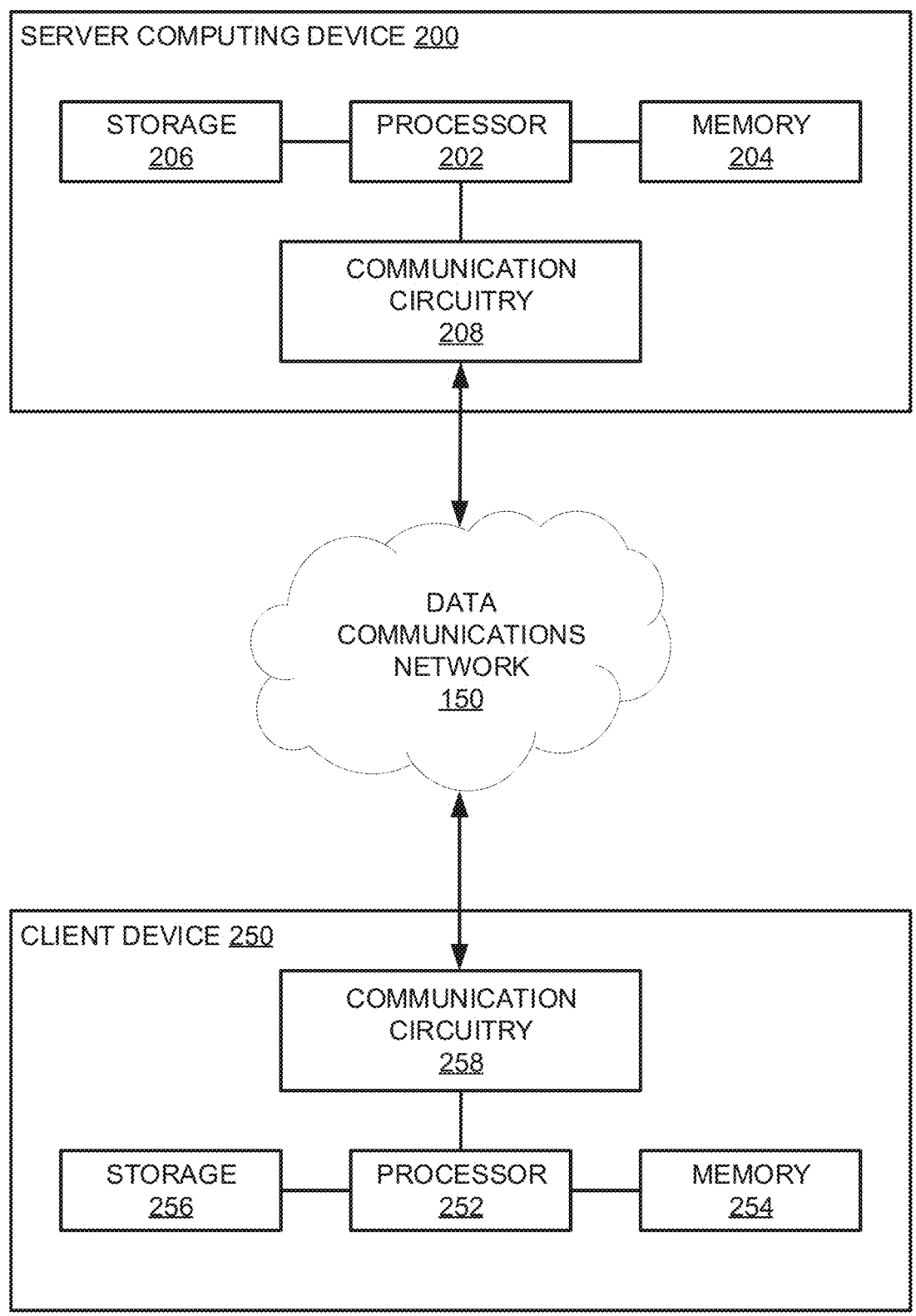
FIG. 2 is a block diagram of an exemplary server computing device and an exemplary client computing device, according to embodiments of the technology described herein.

Referring to FIGS. 1 and 2, an exemplary communications system 100 includes data communications network 150, exemplary server computing devices 200, and exemplary client devices 250. In some embodiments, the system 100 includes one or more server computing devices 200 and one or more client devices 250. Each server computing device 200 can include a processor 202, memory 204, storage 206, and communication circuitry 208. Each client device 250 can include a processor 252, memory 254, storage 256, and communication circuitry 258. In some embodiments, communication circuitry 208 of the server computing devices 200 is communicatively coupled to the communication circuitry 258 of the client devices 250 via data communications network 150. Communication circuitry 208 and communication circuitry 258 can use Bluetooth, Wi-Fi, or any comparable data transfer connection. The client devices 250 can include personal workstations, laptops, tablets, mobile devices, or any other comparable device.

The systems and methods described herein can be implemented using communications system 100. For example, referring to FIG. 3, an exemplary process 300 for identifying data strings in electronic documents using the exemplary data communications network 100 is illustrated. As shown, the process 300 includes electronic documents 310 and electronic reference documents 320 undergoing text processing 330 and similarity determination 340, before being presented to a user using user interface 350. In some embodiments, the electronic documents 310 correspond to contract documents stored on a database implemented by a server computing device 200. Similarly, in some embodiments, electronic reference documents 320 correspond to reference contract clauses stored on a database implemented by a server computing device 200. The electronic documents 310 and electronic reference documents 320 can be stored on the same database or on different databases. As described further below with respect to FIGS. 4-6, the electronic documents 310 and electronic reference documents 320 can be read and fed into the text processing engine 330, after which the similarity determination 340 is applied and the results are populated in the user interface 350. The user interface 350 can be used to determine feedback about the performance of the similarity determination 340, which can be utilized in fine-tuning the results presented in the user interface 350.

Figure 3:
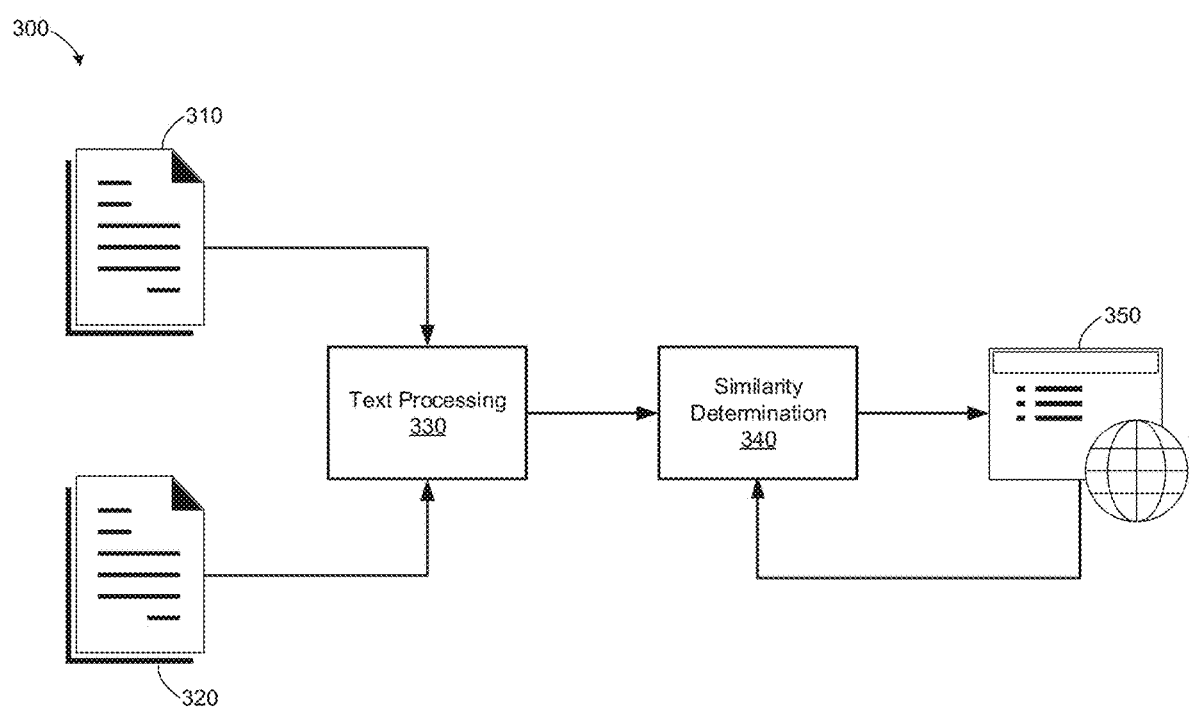
FIG. 3 is a diagram showing a visualization of an exemplary process for identifying data strings in electronic documents using the exemplary data communications network shown in FIGS. 1 and 2, according to embodiments of the technology described herein.
Figure 4:
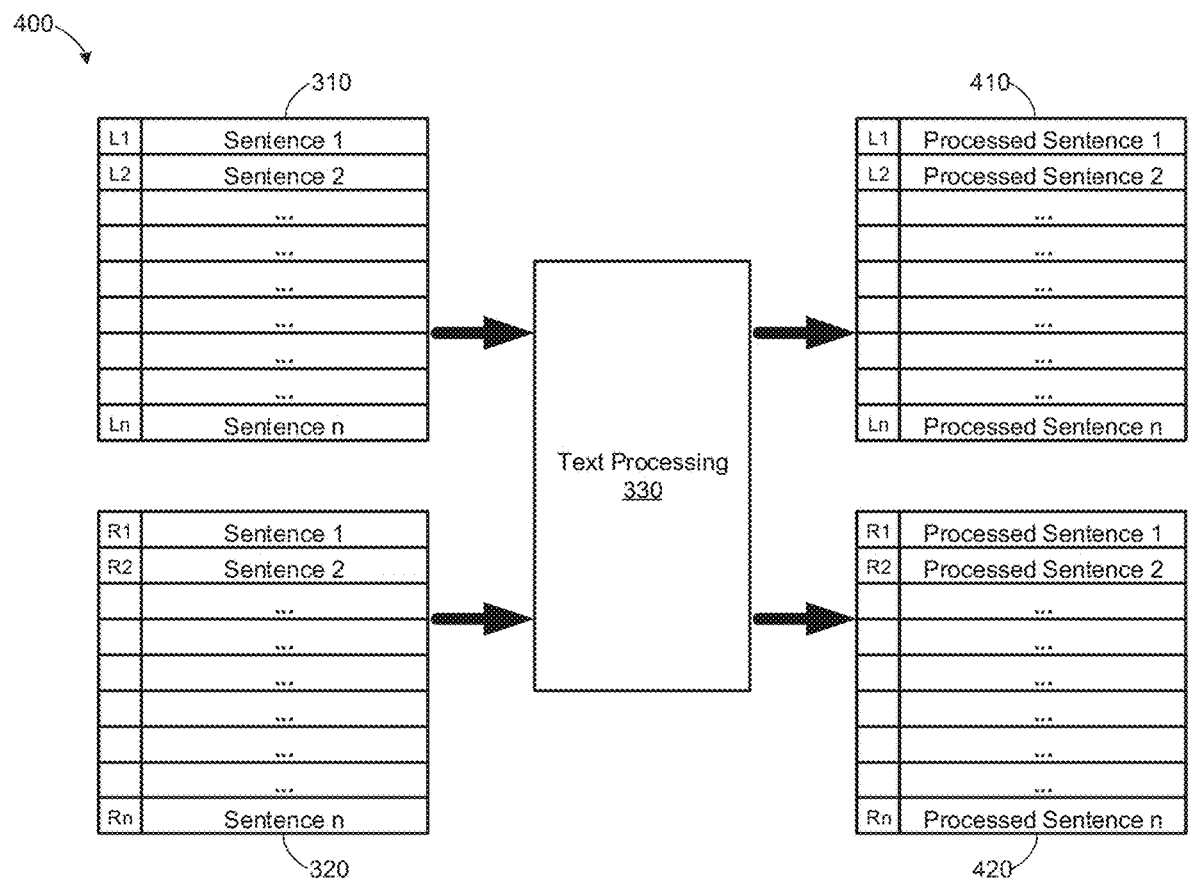
FIG. 4 is a diagram showing a visualization of an exemplary process for processing the electronic documents shown in FIG. 3, according to embodiments of the technology described herein.

Referring to FIG. 4, an exemplary process 400 for processing the electronic documents shown in FIG. 3 using text processing engine 330 is illustrated. The text processing engine 330 processes every incoming sentence of the electronic documents 310 and 320 such that they are in a format that can be fed to the similarity determination models 340. For example, in some embodiments, the text processing engine 330 can remove stop-words, remove punctuation, remove digits, convert to lower-case, or lemmatize. Stop words are words which are filtered out before processing of natural language data or text. Stop words are generally the most common words in a language, e.g., the, is, at, which, and on but are not critical for the context in the sentence. For example, removing stop-words from the following sentence: "this is a sample sentence, showing off the stop words filtration," becomes a processed sentence: "this sample sentence, showing stop words filtration."

Other examples involve removing punctuation or digits from the pre-processed sentence. For example, removing punctuation from the following sentence: "this is a sample sentence, to show stripping punctuation," becomes a processed sentence: "this is a sample sentence to show stripping punctuation." Similarly, removing digits from the following sentence: "this is 1 sample sentence that contains 1 numeric character," becomes a processed sentence: "this is sample sentence that contains numeric character." Lemmatization, on the other hand, is the process of converting a word to its base form by considering the context. For example, lemmatizing the following sentence: "sample sentences that shows lemmatization," results in a processed sentence: "sample sentence that show lemmatization."

Figure 5:
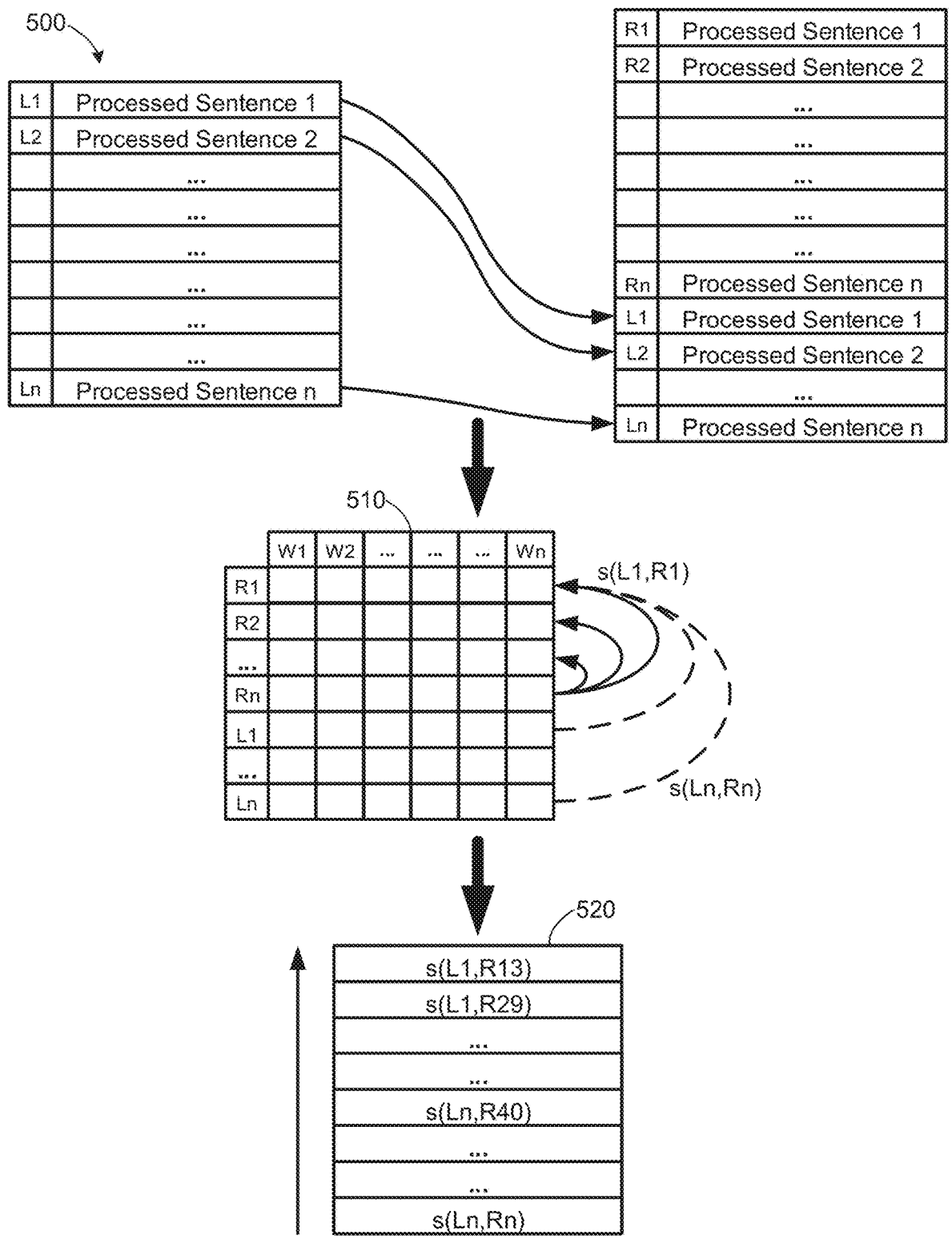
FIG. 5 is a diagram showing a visualization of an exemplary process for calculating a similarity of data strings in the electronic documents shown in FIG. 3, according to embodiments of the technology described herein.

Every sentence in an electronic document 310 and reference electronic document 320 is processed by the text processing engine 330. The resulting output is processed electronic document 410 and processed reference document 420. Referring to FIG. 5, an exemplary process 500 for calculating a similarity of data strings in the processed electronic documents 410 and 420 using similarity determination models 340 is illustrated. The similarity determination models 340 include cosine similarity models using a term frequency-inverse document frequency ("TF-IDF") algorithm and a centroid-based algorithm.

A TF-IDF cosine similarity algorithm uses "local" context—the words that are used within the clauses from the processed reference documents 420 are compared with the clauses from the processed electronic documents 410 one at a time and tagged if found similar based on the co-occurrence of the word alone. This algorithm does not bother with "global" context—in general usage how any word is used and how its occurrences affect the context of the statement is not considered in this approach. On the other hand, a centroid-based cosine similarity algorithm uses Word Embeddings, which provide a "global" context. In some embodiments, combining both algorithms improves the performance of the system and accuracy of the results.

TF-IDF is a measure of originality of a word by comparing the number of times a word appears in a single document with the number of documents the word appears in. For a term i in document j:

$$TFIDF : w_{i,j} = tf_{i,j} \times \log\left(\frac{N}{df_i}\right),$$

where $tf_{i,j}$ is the number of occurrences of i in j, $df_i$ is the number of documents containing i, and N is the total number of documents. As shown in FIG. 5, a TF-IDF matrix 510 is computed for every processed electronic document 410 and processed reference document 420. For example, when comparing the following sentences: "this is sample sentence" and "this sample sentence is to understand tfidf," N is 2 and the TF-IDF matrix 510 is:

|   | is | sample | sentence | tfidf | this | to | understand |
|---|---|---|---|---|---|---|---|
| 0 | 0.5 | 0.5 | 0.5 | 0 | 0.5 | 0 | 0 |
| 1 | 0.317404 | 0.317404 | 0.317404 | 0.446101 | 0.317404 | 0.446101 | 0.446101 |

Cosine similarity is a metric used to measure how similar the documents are irrespective of their size. Mathematically, it measures the cosine of the angle between two vectors projected in a multi-dimensional space. The cosine similarity is advantageous because even if the two similar documents are far apart by the Euclidean distance (due to the size of the document), chances are they may still be oriented closer together. The smaller the angle, higher the cosine similarity with max value being 1. For two vectors, a and b, the cosine similarity is:

$$\cos\theta = \frac{\vec{a} \cdot \vec{b}}{\|\vec{a}\|\|\vec{b}\|} = \frac{\sum_{1}^{n} a_i b_i}{\sqrt{\sum_{1}^{n} a_i^2} \sqrt{\sum_{1}^{n} b_i^2}},$$

where $\vec{a} \cdot \vec{b}$ is the dot product of the two vectors. For the above example, the two sentences have a cosine similarity score of 0.63. The cosine similarity score is calculated for every sentence in the processed electronic document 410 against every sentences in the processed reference document 420. The calculated cosine similarity scores 520 are arranged in descending order, with highest scores of similarities being on top.

The centroid-based cosine similarity algorithm uses Word Embeddings, which provide a "global" context. Word Embeddings are a type of word representation that allows words with similar meaning to have a similar representation. Using this algorithm, individual words are represented as real-valued vectors in a predefined vector space. Each word is mapped to one vector and the vector values are learned in a way that resembles a neural network. Each word is represented by a real-valued vector, often tens or hundreds of dimensions. The distributed representation is learned based on the usage of words. This allows words that are used in similar ways to result in having similar representations, naturally capturing their meaning. Examples of pre-trained Word Embeddings are word2vec and GloVe. The centroid similarity equates to:

$$\text{Centroid} = \frac{\sum w_i * TF - IDF_i}{TF - IDF_i},$$

a sum of the products of the embedding vectors and TF-IDFs. For the above example, the centroid-based similarity score is 0.65. The centroid-based cosine similarity score is calculated for every sentence in the processed electronic document 410 against every sentences in the processed reference document 420. Similarly, the calculated centroid-based cosine similarity scores 520 are arranged in descending order, with highest scores of similarities being on top.

Figure 6:
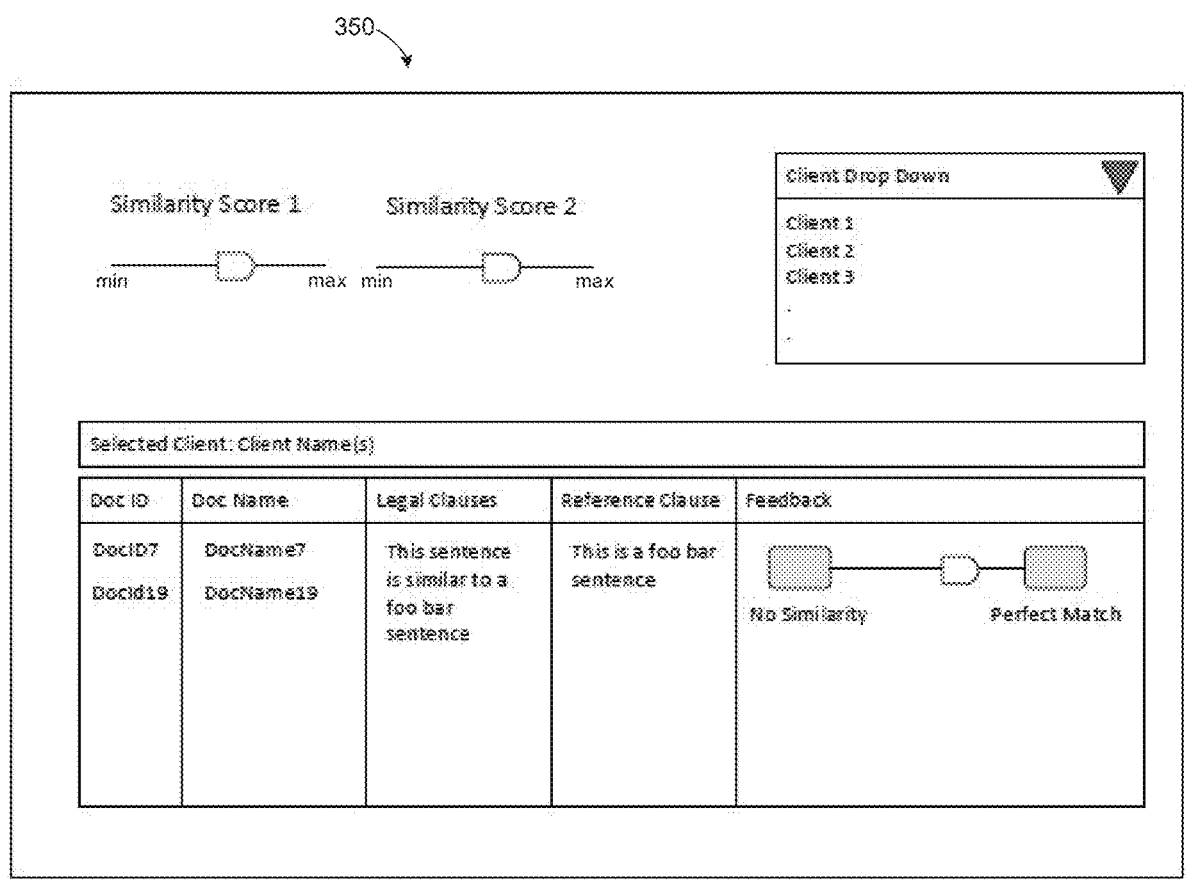
FIG. 6 is a diagram showing a visualization of an exemplary user interface for determining feedback on the similarity scores, according to embodiments of the technology described herein.

As shown in FIG. 6, the output of the similarity determinations models 340 is represented in user interface 350, and includes the respective sentence from the electronic document 310, the respective sentence from the electronic reference document 320, and their cosine similarity score. In some embodiments, user interface 350 also includes IDs for the electronic documents 310. The user interface 350 can be used to determine a feedback for each of the presented similarity scores. For example, in some embodiments a user can use the user interface 350 to provide the feedback. In some embodiments, the user interface 350 includes a sliding scale that the user can use to provide the feedback.

Using the originally presented similarity scores as independent variables and the feedback provided by the users as the target, a Random Forrest algorithm can be applied to further refine the results presented using the user interface 350. A random forest algorithm is a classification algorithm consisting of many decisions trees. It uses bagging and feature randomness when building each individual tree to try to create an uncorrelated forest of trees whose prediction by committee is more accurate than that of any individual tree. For example, the system can use the feedback to create a probability score. The probability score acts as a weight to the similarity scores in the subsequent searches, thereby increasing the model efficiency.

Figure 7:
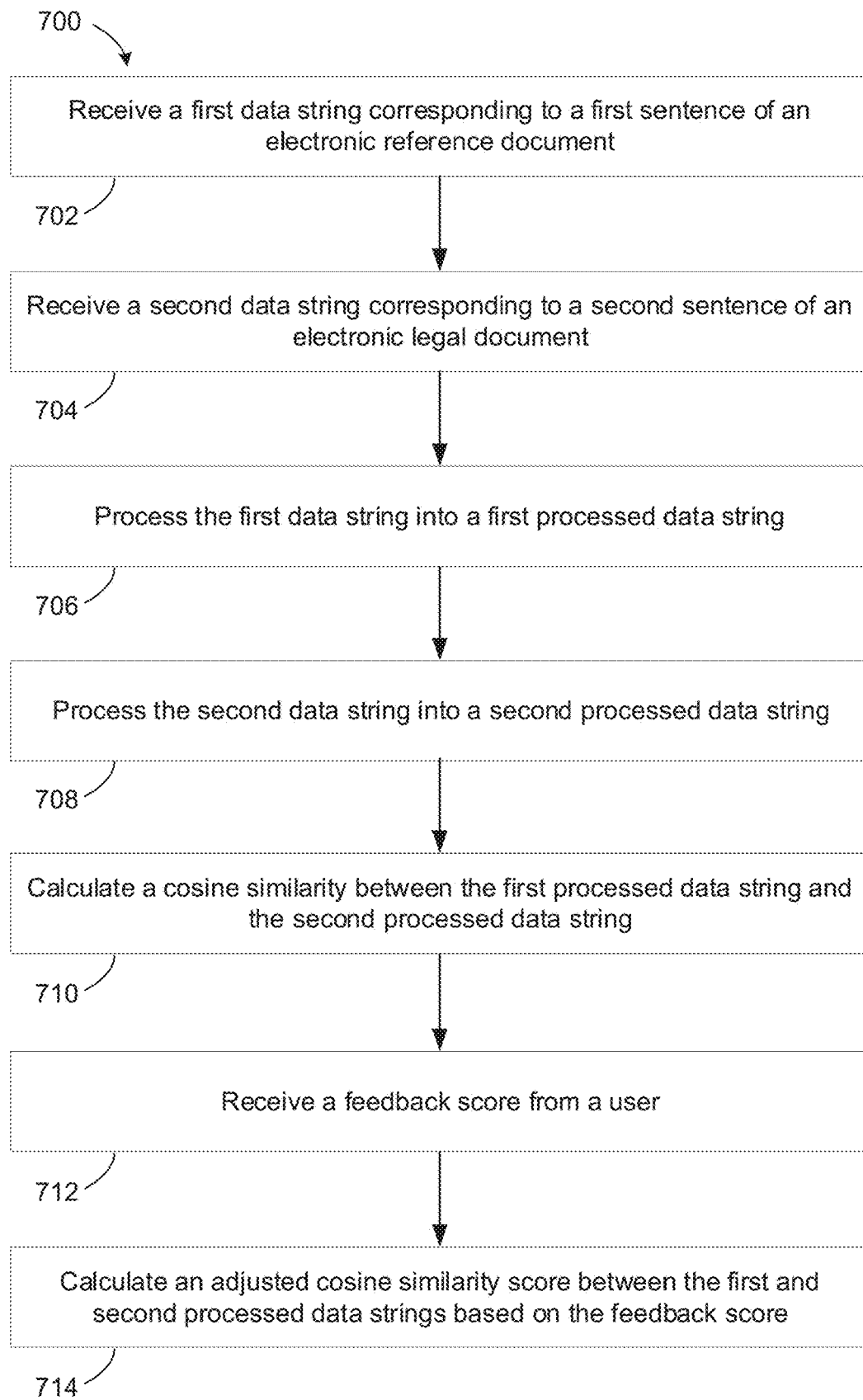
FIG. 7 is a flow diagram of a computer-implemented method for identifying data strings in electronic documents using pattern recognition using the exemplary data communications network shown in FIGS. 1 and 2, according to embodiments of the technology described herein.

Referring to FIG. 7, a process 700 for identifying data strings in electronic documents using pattern recognition is illustrated. The process 700 begins by receiving, by a server computing device 200, a first data string corresponding to a first sentence of an electronic reference document 320 from a first database in step 702. Process 700 continues by receiving, by the server computing device 200, a second data string corresponding to a second sentence of an electronic legal document 310 from a second database in step 704.

Process 700 continues by processing, by the server computing device 200, the first data string corresponding to the first sentence into a first processed data string in step 706. Process 700 continues by processing, by the server computing device 200, the second data string corresponding to the second sentence into a second processed data string in step 708. As described in relation to FIG. 4, processing the first data string and the second data string can include at least one of removing stop words, removing punctuation, removing digits, converting all characters to lower-case, or lemmatization. In some embodiments, the server computing device 200 is configured to generate a processed electronic document 410 and a processed reference document 420 in response to processing the first data string and the second data string.

Process 700 continues by calculating, by the server computing device 200, a cosine similarity between the first processed data string and the second processed data string in step 710. As described in relation to FIG. 5, the cosine similarity is based on a term frequency-inverse document frequency algorithm and a centroid-based algorithm. In some embodiments, the term frequency-inverse document frequency algorithm includes comparing words of the first processed data string with words of the second processed data string one word at a time. In some embodiments, the centroid-based algorithm includes representing words of the first processed data string and words of the second processed data string as real-valued vectors.

Process 700 continues by receiving, by the server computing device 200, a feedback score from a user in step 712. The feedback score corresponds to an accuracy of the calculated cosine similarity between the first processed data string and the second processed data string. For example, as described in relation to FIG. 6, a user interface 350 can be configured to determine a feedback from a user. Process 700 finishes by calculating, by the server computing device 200, an adjusted cosine similarity between the first processed data string and the second processed data string based on the calculated cosine similarity and the feedback score in step 714. In some embodiments, the server computing device 200 is configured to calculate the adjusted cosine similarity based on a random forest machine learning algorithm. In some embodiments, the server computing device 200 is configured to generate for display the first sentence, the second sentence, and at least one of the calculated cosine similarity, the feedback score, or the calculated adjusted cosine similarity using user interface 350.

In some aspects, the above-described techniques can be implemented on a system for identifying data strings in electronic documents using pattern recognition. The system includes a server computing device 200 communicatively coupled to a first database, a second database, and a display device. The server computing device 200 is configured to receive a first data string corresponding to a first sentence of an electronic reference document 320 from the first database. The server computing device 200 is also configured to receive a second data string corresponding to a second sentence of an electronic legal document 310 from the second database. Further, the server computing device 200 is configured to process the first data string corresponding to the first sentence into a first processed data string. The server computing device 200 is also configured to process the second data string corresponding to the second sentence into a second processed data string. Processing the first data string and the second data string includes at least one of removing stop words, removing punctuation, removing digits, converting all characters to lower-case, or lemmatization. The server computing device 200 is also configured to calculate a cosine similarity between the first processed data string and the second processed data string. The cosine similarity is based on a term frequency-inverse document frequency algorithm and a centroid-based algorithm. Further, the server computing device 200 is configured to receive a feedback score from a user. The feedback score corresponds to an accuracy of the calculated cosine similarity between the first processed data string and the second processed data string. The server computing device 200 is also configured to calculate an adjusted cosine similarity between the first processed data string and the second processed data string based on the calculated cosine similarity and the feedback score.

The systems and methods described herein address the concerns related to current methods of identifying similarities between data strings in electronic documents. The systems and methods described herein combines local and global context to provide end users with improved performance and results For example, instead of using supervised machine learning which requires annotated datasets, the systems and methods described herein uses unsupervised machine learning from the outset. The systems and methods described herein provides end users with interim results using a unique and easy to use user interface which also allows for feedback determination. The systems and methods described herein also uses feedback to train a supervised learning model. Further, the systems and methods described herein provides a continuous learning enablement which improves the effectiveness of data string identification in electronic documents.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output, based on example input-output, pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A method for identifying data strings in electronic documents using pattern recognition, the method comprising:

receiving, by a server computing device, a first data string corresponding to a first sentence of a first plurality of sentences of an electronic reference document from a first database;

receiving, by the server computing device, a second data string corresponding to a second sentence of a second plurality of sentences of an electronic legal document from a second database;

processing, by the server computing device, the first data string corresponding to the first sentence into a first processed data string, wherein processing the first data string comprises at least one of removing stop words, removing punctuation, removing digits, converting all characters to lower-case, or lemmatization;

processing, by the server computing device, the second data string corresponding to the second sentence into a second processed data string, wherein processing the second data string comprises at least one of removing stop words, removing punctuation, removing digits, converting all characters to lower-case, or lemmatization;

computing, by the server computing device, a term frequency-inverse document frequency (TF-IDF) matrix based upon the first processed data string and the second processed data string;

generating, by the server computing device, a real-valued vector for each word in the first processed data string and for each word in the second processed data string;

calculating, by the server computing device, a centroid-based cosine similarity score using the TF-IDF matrix and the real-valued vectors for the words in each of the first processed data string and the second processed data string, wherein the centroid-based cosine similarity score is calculated by:

$$S = \frac{\sum w_i * TF - IDF_i}{TF - IDF_i},$$

wherein S is the centroid-based cosine similarity score, $w_i$ are the real-vector values, and $TF\text{-}IDF_i$ is the TF-IDF matrix;

receiving, by the server computing device, a feedback score from a user, wherein the feedback score corresponds to an accuracy of the centroid-based cosine similarity score between the first processed data string and the second processed data string; and calculating, by the server computing device, an adjusted centroid-based cosine similarity score between the first processed data string and the second processed data string based on the centroid-based cosine similarity score and the feedback score.

2. The method of claim 1, wherein the server computing device is configured to process the first data string and the second data string by removing stop words.

3. The method of claim 1, wherein the server computing device is configured to process the first data string and the second data string by removing punctuation.

4. The method of claim 1, wherein the server computing device is configured to process the first data string and the second data string by removing digits.

5. The method of claim 1, wherein the server computing device is configured to process the first data string and the second data string by converting all characters to lower-case.

6. The method of claim 1, wherein the server computing device is configured to process the first data string and the second data string through lemmatization.

7. The method of claim 1, wherein the TF-IDF matrix is computed by comparing each word of the first processed data string with each word of the second processed data string one word at a time.

8. The method of claim 1, wherein the server computing device is configured to calculate the adjusted centroid-based cosine similarity score based on a random forest machine learning algorithm.

9. The method of claim 1, wherein the server computing device is configured to generate for display the first sentence of the first plurality of sentences, the second sentence of the second plurality of sentences, and at least one of the calculated centroid-based cosine similarity score, the feedback score, or the calculated adjusted centroid-based cosine similarity score.

10. A system for identifying data strings in electronic documents using pattern recognition, the system comprising:
a server computing device communicatively coupled to a first database, a second database, and a display device, the server computing device configured to:
receive a first data string corresponding to a first sentence of a first plurality of sentences of an electronic reference document from the first database;
receive a second data string corresponding to a second sentence of a second plurality of sentences of an electronic legal document from the second database;
process the first data string corresponding to the first sentence into a first processed data string, wherein processing the first data string comprises at least one of removing stop words, removing punctuation, removing digits, converting all characters to lower-case, or lemmatization;
process the second data string corresponding to the second sentence into a second processed data string, wherein processing the second data string comprises at least one of removing stop words, removing punctuation, removing digits, converting all characters to lower-case, or lemmatization;
compute a term frequency-inverse document frequency (TF-IDF) matrix based upon the first processed data string and the second processed data string;
generate a real-valued vector for each word in the first processed data string and for each word in the second processed data string;
calculate a centroid-based cosine similarity score using the TF-IDF matrix and the real-valued vectors for the words in each of the first processed data string and the second processed data string, wherein the centroid-based cosine similarity score is calculated by:

$$S = \frac{\sum w_i * TF-IDF_i}{TF-IDF_i},$$

wherein S is the centroid-based cosine similarity score, $w_i$ are the real-vector values, and $TF\text{-}IDF_i$ is the TF-IDF matrix;
receive a feedback score from a user, wherein the feedback score corresponds to an accuracy of the calculated cosine similarity between the first processed data string and the second processed data string; and
calculate an adjusted cosine similarity between the first processed data string and the second processed data string based on the calculated cosine similarity and the feedback score.

11. The system of claim 10, wherein the server computing device is configured to process the first data string and the second data string by removing stop words.

12. The system of claim 10, wherein the server computing device is configured to process the first data string and the second data string by removing punctuation.

13. The system of claim 10, wherein the server computing device is configured to process the first data string and the second data string by removing digits.

14. The system of claim 10, wherein the server computing device is configured to process the first data string and the second data string by converting all characters to lower-case.

15. The system of claim 10, wherein the server computing device is configured to process the first data string and the second data string through lemmatization.

16. The system of claim 10, wherein TF-IDF matrix is computed by comparing each word of the first processed data string with each word of the second processed data string one word at a time.

17. The system of claim 10, wherein the server computing device is configured to calculate the adjusted centroid-based cosine similarity score based on a random forest machine learning algorithm.

18. The system of claim 10, wherein the server computing device is configured to generate for display the first sentence of the first plurality of sentences, the second sentence of the second plurality of sentences, and at least one of the calculated centroid-based cosine similarity score, the feedback score, or the calculated adjusted centroid-based cosine similarity score.

* * * * *